US012651503B2

(12) United States Patent
Futas et al.

(10) Patent No.: US 12,651,503 B2
(45) Date of Patent: Jun. 9, 2026

(54) SYSTEMS AND METHODS FOR MITIGATING PUBLIC BIO-HEALTH AND SAFETY THREATS IN WORK AND MARKETPLACES

(71) Applicant: ARMS3 Solutions, LLC, Albuquerque, NM (US)

(72) Inventors: Shari Futas, Albuquerque, NM (US); Lucretia Lake, Albuquerque, NM (US)

(73) Assignee: ARMS3 SOLUTIONS, LLC, Albuquerque, NM (US)

( * ) Notice: Subject to any disclaimer, the term of this patent is extended or adjusted under 35 U.S.C. 154(b) by 18 days.

(21) Appl. No.: 18/482,501

(22) Filed: Oct. 6, 2023

(65) Prior Publication Data

US 2024/0119775 A1 Apr. 11, 2024

Related U.S. Application Data

(60) Provisional application No. 63/414,353, filed on Oct. 7, 2022.

(51) Int. Cl.
*G07C 9/32* (2020.01)
*G08B 25/01* (2006.01)

(52) U.S. Cl.
CPC ............... *G07C 9/32* (2020.01); *G08B 25/01* (2013.01)

(58) Field of Classification Search
CPC ................................. G07C 9/32; G08B 25/01
See application file for complete search history.

(56) References Cited

U.S. PATENT DOCUMENTS

| | | | | |
|---|---|---|---|---|
| 7,252,331 | B1 * | 8/2007 | Walton | A47C 11/00 297/452.64 |
| 8,384,542 | B1 * | 2/2013 | Merrill | G08B 25/01 340/541 |

(Continued)

OTHER PUBLICATIONS

The White House; 2022 National Biodefense Strategy and Implementation Plan for Countering Biological Threats, Enhancing Pandemic Preparedness, and Achieving Global Health Security (on-line https://www.whitehouse.gov/wp-content/uploads/2022/10/National-Biodefense-Strategy-and-Implementation-Plan-Final.pdf); Oct. 2022; 53 pages.

(Continued)

*Primary Examiner* — Thomas D Alunkal
(74) *Attorney, Agent, or Firm* — STETINA GARRED BRUCKER & NEWBOLES

(57) ABSTRACT

Systems and methods are contemplated for preventing an entrant and a threat associated therewith from accessing a protected area. An automated clearance procedure may be performed, which may comprise scanning the entrant with a plurality of sensors to obtain measurements, from which parameters corresponding to bio-health risk factors and/or concealed weapon identification may be derived. The clearance procedure may further comprise obtaining information from the entrant and/or retrieving information previously compiled therefrom. From this data, the identity of the threat and the associated risk may be found, which may be carried out via processors within a local network hub and/or a cloud-based system or both. From this threat data, an automated threat response procedure may be carried out, which may comprise denying the entrant access to the protected area, at least partially containing the entrant in a clearance entry point, and/or notifying one or more agencies of the threat.

20 Claims, 4 Drawing Sheets

(56) References Cited

U.S. PATENT DOCUMENTS

| | | | | |
|---|---|---|---|---|
| 9,922,515 | B2 * | 3/2018 | Hoy | G08B 15/02 |
| 10,138,642 | B2 * | 11/2018 | Slagel | E04H 1/1227 |
| 10,184,759 | B2 * | 1/2019 | Wadley | B32B 5/26 |
| 10,788,294 | B2 | 9/2020 | Goodson et al. | |
| 11,164,415 | B1 * | 11/2021 | Reynolds, III | G06T 7/73 |
| 2014/0061273 | A1 * | 3/2014 | Bullivant | A45F 3/04 224/576 |
| 2019/0197848 | A1 * | 6/2019 | Bradley | G08B 29/188 |
| 2020/0320814 | A1 * | 10/2020 | Hastings | G01V 5/20 |
| 2022/0099823 | A1 * | 3/2022 | Aeron | G01S 13/867 |

OTHER PUBLICATIONS

The White House; National Security Memorandum on Countering Biological Threats, Enhancing Pandemic Preparedness, and Achieving Global Health Security; Oct. 2022 [retrieved Oct. 30, 2022]; Retrieved from the Internet: https://www.whitehouse.gov/briefing-room/presidential-actions/2022/10/18/national-security-memorandum-on-countering-biological-threats-enhancing-pandemic-preparedness-and-achieving-global-health-security/.

U.S.Department of Health & Human Services; National Biodefense Strategy; [retrieved Oct. 30, 2022]; Retrieved from the Internet: https://aspr.hhs.gov/biodefense/Pages/default.aspx.

U.S.Department of Health & Human Services; HHS Announces Actions to Counter Biological Threats, Enhance Pandemic Preparedness, and Achieve Health Security; Oct. 18, 2022; [retrieved Oct. 30, 2022]; Retrieved from the Internet: https://www.hhs.gov/about/news/2022/10/18/hhs-announces-actions-to-counter-biological-threats-enhance-pandemic-preparedness-and-achieve-health-security.html.

Fortune Business Insights; Critical Infrastructure Protection (CIP) Market Size Worth USD 154.59 Billion in 2027 6.2% CAGR; Jul. 2, 2022 [retrieved Oct. 27, 2022]; Retrieved from the Internet: https://www.globenewswire.com/en/news-release/2022/07/07/2475880/0/en/Critical-Infrastructure-Protection-CIP-Market-Size-Worth-USD-154-59-Billion-in-2027-6-2-CAGR.html.

Homeland Preparedness News; Bipartisan Commission on Biodefense warns of biological threats to critical U.S. infrastructure; Oct. 6, 2021 [retrieved Oct. 27, 2022]; Retrieved from the Internet: https://homelandprepnews.com/stories/74104-bipartisan-commission-on-biodefense-warns-of-biological-threats-to-critical-u-s-infrastructure/.

* cited by examiner

SYSTEMS AND METHODS FOR MITIGATING PUBLIC BIO-HEALTH AND SAFETY THREATS IN WORK AND MARKETPLACES

CROSS-REFERENCE TO RELATED APPLICATIONS

This application relates to and claims the benefit of U.S. Provisional Application No. 63/414,353 filed Oct. 7, 2022, and entitled "SYSTEMS AND METHODS FOR MITIGATING PUBLIC BIO-HEALTH & SAFETY THREATS IN WORK AND MARKETPLACES," the entire disclosure of which is hereby wholly incorporated by reference.

STATEMENT RE: FEDERALLY SPONSORED RESEARCH/DEVELOPMENT

Not Applicable

BACKGROUND

1. Technical Field

The present disclosure generally relates to critical infrastructure protection via the detection and mitigation of potential threats associated with entrants attempting to gain access to protected areas, which could include workplaces, marketplaces, government buildings, public event locales, and more. More particularly, the present disclosure relates to the automated surveillance, detection, risk assessment, and response initiation for multiple threats associated with entrants attempting to gain access to a protected area, including bio-health and concealed weapons threats.

2. Related Art

The combined impact of rising bio-health and safety threats has made people, businesses, infrastructure, and government more vulnerable than at any time in history. The COVID-19 pandemic stands as an example of the high impact associated with inadvertent exposure to mass viral contagions. Since 2020, over 1.4 million people have died in the U.S. from the COVID-19 pandemic at a cost of over $16 trillion stemming from loss of life, hospitalizations, daily testing and reporting, business closures, escalated costs, and financial losses. The transmission of this threat was broadly caused by a delay in early notification and effective interdiction guidelines, a delay in availability of necessary test devices and supplies, and a dependence upon untrained, ill-equipped, and understaffed organizations struggling to mount an effective response in the face of a rising crisis. Thermal guns and monitors were widely used during the pandemic to identify individuals with temperatures exceeding 100.4° F., a potential indicator of viral infection. These devices, extensively employed in work and marketplaces, often led to false readings caused by user error, instrument calibration error, and/or temperature biases resulting from prior heat and sun exposure. As a result, these critical pass-fail entry decisions were often flawed due to both these induced errors as well reliance upon a single parameter, body temperature, in the absence of additional measured data or insight. It is thus easy to understand how the transmission of the debilitating, infectious virus became so accelerated. In addition, U.S. government agencies forecast an increase in the weaponization of highly contagious bacterial and viral agents to disable governments and organizations across the globe, thus presenting a need to improve current detection and protection methodologies against these threats. The "2022 National Biodefense Strategy and Implementation Plan for Countering Biological Threats, Enhancing Pandemic Preparedness, and Achieving Global Health Security", and the "National Security Memorandum on Countering Biological Threats, Enhancing Pandemic Preparedness, and Achieving Global Health Security" both dated October 2022 and incorporated herein by reference in their entirety, highlight the recommendations, guidelines, and requirements the federal government has established to identify and counter these threats.

Similarly, escalating public gun violence is now at the highest point in recent human history. These mass shooting events are occurring in virtually any venue or forum imaginable at an exponentially increasing rate, impacting business, government, and infrastructure and changing the way life and business is conducted day to day. At a staggering cost of $557 billion annually, the daily reports of public injury and death from person-borne weapons have become routine in the U.S., claiming more lives daily than ever before. This same escalation appears to be underway in other nations, as well.

Conventional security solutions have typically relied upon a plethora of different individual sensor/threat mitigation devices pieced together including cameras, portals, stanchions, and turnstiles to name a few. However, many of these security mechanisms fail to adequately identify security threats at an early enough time frame to perform any preemptive safety measures. For example, one very common type of detection regularly used by security planners is closed-circuit television (CCTV) surveillance footage, which relies upon continuous visual assessment for threat detection and is only able to detect what is visible to the naked eye. Often unforeseen threats have necessitated the addition of unplanned layers of security over time, resulting in increasing operational impacts such as subsystem incompatibility, lag-time and delay, and inability to establish device-to-device communication, for example. Conventional systems tend to be placed in the line of sight of foot traffic, leaving them easily identified and disabled by would-be attackers. The undesirable security system vulnerabilities and erroneous alerts associated with such systems have resulted in an increased user workload in response to these security threats and reduced overall effectiveness of those systems throughout the industry.

The ability to identify unusual bio-health and/or physiological indicators of an impending health crises, as well as physical safety threat such as concealed weapons, can provide improved insight and valuable granularity in the determination of an effective and timely response. Moreover, conventional systems cannot currently provide security personnel with baseline biometrics that benchmark "normal" for individuals to better detect and identify emergent threats. These bio-health and wellness indicators are key in providing organizations with higher fidelity understanding in identifying and containing would-be threats. Protected, robust technology that better equips businesses, government agencies, infrastructure, and marketplaces to pre-emptively reduce the risk of dangerous events unfolding within facilities or sites where large numbers of people are interacting, working, and/or encountering others are thus desirable and needed in the art.

BRIEF SUMMARY

To solve these and other problems, the present disclosure is directed to systems and methods that may provide infrastructure protection and mitigate crises through a smart, pivotable detection and notification platform that can safeguard people, facilities, and sites against multiple threats. A method of preventing an entrant associated with a potential threat from gaining access to a protected area may comprise performing an initial threat detection scan while an entrant approaches the protected area, which can provide advanced situational awareness and early warning insights to organizational security. When the entrant attempts to gain access to the protected area, an automated clearance procedure may be performed in advance of or at a clearance entry point to detect the potential threat; thereafter a threat response procedure may be performed based on the detected potential threat. The initial steps performed in a clearance procedure may include scanning the entrant with a plurality of sensors to derive parameters that correspond to the potential threat, retrieving information previously compiled from the entrant, and/or obtaining information directly from the entrant. The clearance procedure could then comprise further actionable steps, which can include rescanning the entrant with the plurality of sensors to rederive the parameters to confirm the presence of the potential threat, testing the entrant to confirm the presence of a health threat (in which case the entrant could first be referred to an offsite testing location), and/or testing an object the entrant is carrying to confirm the presence of a physical threat. The entrant may first be directed to a quarantine area wherein these additional steps may be performed. Based on the data from a clearance procedure, a threat response procedure may be performed, which can provide for preemptive interdiction to mitigate the harm the threat(s) could cause.

Detectable threats include, but are not limited to, health threats such as bio-health threats the entrant may be infected with (i.e., viral infections, bacterial infections) and physiological indicators that may predict an impending critical health event associated with an entrant, and/or physical threats like guns, knives, chemical materials, biological materials, radiological materials, nuclear materials, and explosive materials. At least some of the plurality of sensors may be passive sensors, while others may be active sensors which can be activated during the clearance procedure; these sensors may establish electronic rings or protection around a protected area, whereby threats could be progressively easier to detect as they approach the protected area. Sensors may be positioned throughout the protected area, entrance (s), and premises and may further be associated with structures found therein, which could come in the form of embedding the sensors within those structures or fixtures as necessary.

Some or all of the steps of a clearance procedure may be performed within a clearance entry point associated with a primary entrance for the protected area. A prescreening device, which could be found within a housing, fixture or structure, may be found in this clearance entry point, which the entrant can be instructed to interact with as part of the clearance procedure. The entrant may provide information through the prescreening device and/or the entrant can be identified by providing an identifier, like an employee ID card, a QR code, ticket, etc., to a scanner on the prescreening device or app. Identifying the entrant in this manner may allow previously compiled information for that entrant to be retrieved, which may include a wellness baseline for that entrant. This prescreening device could take the form of a smart device.

A threat associated with the entrant may be identified and the risk associated therewith may be determined from the information obtained from the clearance procedure via one or more processors. The processor(s) may be installed within a local network hub, a cloud-based system (which may be a closed cloud system), or both, and if both are present, they may communicate with each other, and both may contribute to determining a threat response procedure for the particular threat identified and ascertained. The threat response procedure may be based on governmental or organizational guidelines corresponding to the threat identified. This may come in the form of comparing the parameters derived from the sensor measurements with threshold levels which may indicate the level of risk associated with that threat when said parameter exceeds certain threshold levels. The wellness baseline of an entrant may also be compared to the obtained sensor measurements. Any data obtained from an entrant can be encrypted and anonymized in accordance with the Health Insurance Portability and Accountability Act (HIPAA).

The threat response procedure itself may comprise denying the entrant from gaining access to the protected area, at least partially containing the entrant (which may be within the clearance entry point or the quarantine area and could be carried out via sealing an entryway associated with the containment area), directing the entrant to the quarantine area (if they are not already there), and/or notifying onsite security, agencies such as governmental authorities, local law enforcement, etc., or both about the threat and/or the entrant. Notifying personnel/organizations may include reporting trends, analytics, and the like corresponding to certain types of threats detected and responded to, thereby accelerating local, state and or government response systems.

A system for preventing an entrant associated with a potential threat from gaining access to a protected area, may comprise: the prescreening device, the plurality of sensors, and the one or more processors, in which the prescreening device and the plurality of sensors may be associated with a primary entrance for the protected area. The system may further include a secondary, tertiary, etc. prescreening device and/or a secondary plurality of sensors associated with a secondary entrance for the protected area which can correspond to a secondary clearance procedure. Identifying an entrant that attempts to enter the protected area via the secondary entrance may lead to the entrant being redirected to the primary entrance, as the secondary entrance could be reserved for entrants with the proper clearance and/or entrants who have recently performed the clearance procedure associated with the primary entrance.

BRIEF DESCRIPTION OF THE DRAWINGS

These and other features and advantages of the various embodiments disclosed herein will be better understood with respect to the following description and drawings, in which like numbers refer to like parts throughout, and in which.

Common reference numerals are used throughout the drawings and the detailed description to indicate the same elements.

DETAILED DESCRIPTION

Figure 1:
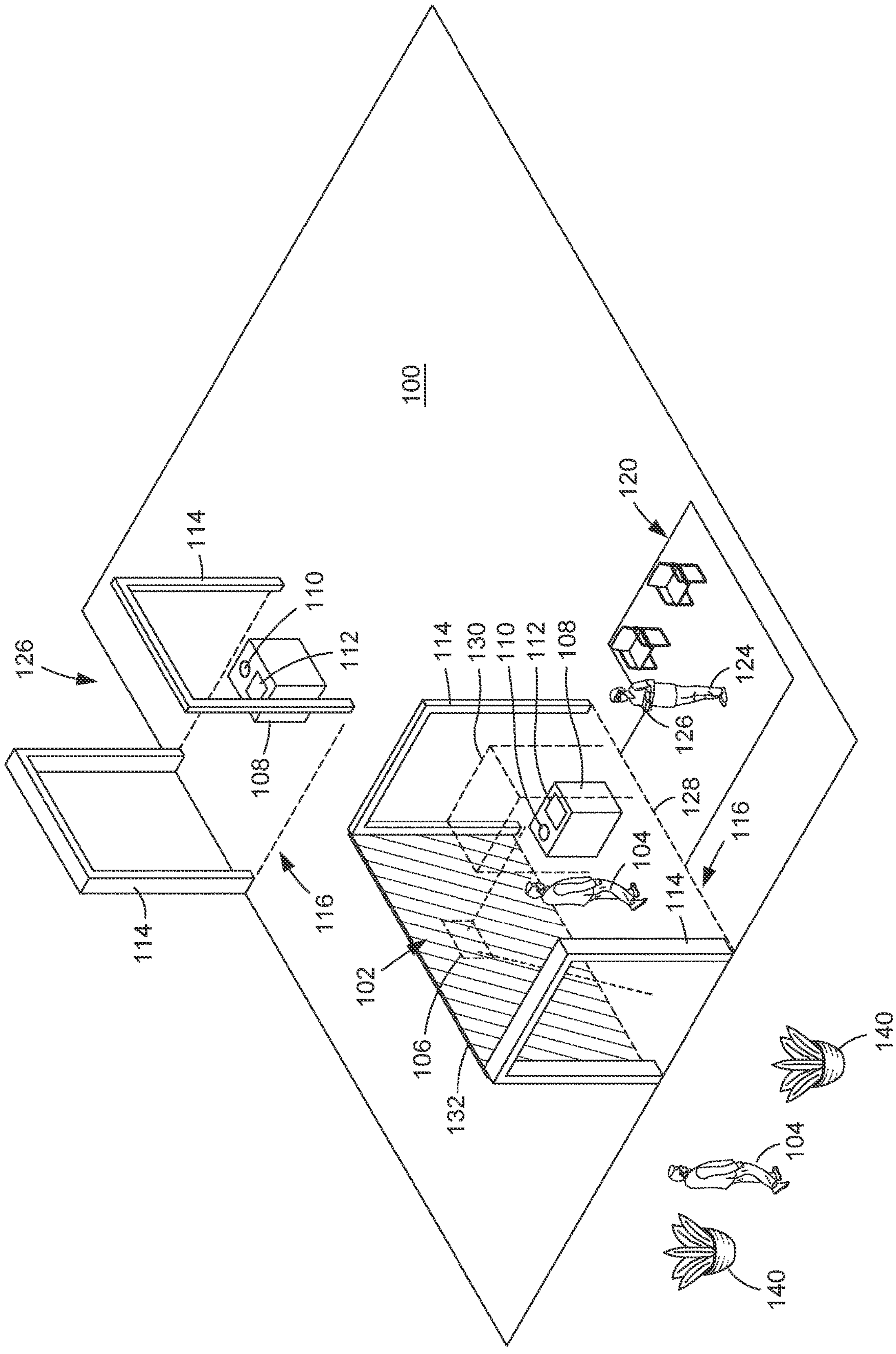
FIG. 1 is an exemplary protected area employing a threat detection and response system according to the disclosure herein.

The present disclosure encompasses various embodiments of methods and systems for detecting and responding to threats associated with entrants attempting to enter a protected area. A preliminary scan may be performed in the perimeter of a protected area as the entrant approaches an entry point, which can provide early warning of entrants that may pose higher risk of threat. Then, an automated clearance procedure may be performed at the entry point, for an entrant attempting to gain access to the protected area, to detect a potential threat associated with the entrant. Such a clearance procedure can comprise scanning the entrant with a plurality of sensors, obtaining information directly from the entrant, and/or retrieving previously compiled information about the entrant. The threat data obtained from a clearance procedure may be used to detect a potential threat and/or determine the risk this threat may pose, which may be performed via one or more processors within a local network hub and/or a cloud-based system. In particular, the threat data may be compared with, for example, safety guidelines, restrictions set for the protected area, and/or symptoms and data corresponding to specific contagions to identify and assess the threat. With the threat identified and its risk found, an automated threat response procedure could be determined and initiated based on the analyzed threat, such as denying the entrant access to the protected area, containing the entrant, and/or notifying the appropriate organizations and personnel, to mitigate harm that may arise from the threat. Such advanced situational awareness may provide preemptive interdiction superior to conventional systems and measures.

Bio-health threats associated with an entrant, physical threats associated with an entrant, or both may be detectable via the smart systems and methods disclosed herein. For bio-health threats, contagions like viral and bacterial infections, including naturally occurring and/or weaponized versions thereof, may be associated with the entrant, including for example, influenza A/B and COVID-19. Future health threats that have yet to exist or become widespread may also be detectable via these systems and methods and will be described in this disclosure. Specific emergent health threats may be targeted for detection during a clearance procedure. Another type of bio-health threat which can be measured are physiological factors that could indicate the entrant may be prone to an impending health-related incident. Physical threats can comprise concealed weapons including, but not being limited to, guns and knives, as well as dangerous materials such as chemical, biological, radiological, nuclear, and explosive materials (CBRNE). Examples of these dangerous materials that are subject to being detected could include Novichok, G and V series agents, pharmaceutical-based agents, HD mustard gas, and other tear-inducing agents, although other types of dangerous materials, including future materials that have yet to be made, may compose a physical threat.

The subject matter disclosed herein will be best understood in view of the drawings, in which exemplary embodiments of the systems and methods disclosed herein are shown. The drawings are intended to illustrate examples and are thus not intended to limit the systems and methods they embody. The detailed description set forth below in connection with the appended drawings is intended as a description of several currently contemplated embodiments and is not intended to represent the only form in which the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. As such the features of actual embodiments may be constructed differently or configured more practically, as would be understood by those skilled in the art, when compared to what is shown in FIG. 1, for example. It is further understood that the use of relational terms such as first and second and the like are used solely to distinguish one from another entity without necessarily requiring or implying any actual such relationship or order between such entities.

Looking first to FIG. 1, an exemplary protected area employing an automated threat detection and response system according to the disclosure herein is shown. A protected area 100 may be indoors, in which case the protected area 100 may be one or more rooms, sections, floors, etc., of a building; the protected area 100 may more broadly be defined by the building, such that the entire interior of that building may be the protected area 100 (such that anyone inside the building is considered to be within the protected area 100). The protected area 100 could alternatively be an outdoor area that is confined by walls or fences like an outdoor festival, amphitheater, campus, etc., or conversely, an open area with general access adjacent to a building. Both indoor and outdoor areas may also comprise a protected area 100, which could be the case for a football stadium, for instance.

There could be multiple protected areas 100 associated with one another. For instance, a first protected area 100 may have a second protected area 100 found within which has a higher degree of restricted access. In this case, the clearance procedure associated with the second protected area 100 may have stricter requirements for an entrant 104 to enter and/or have more/stronger sensors 106 employed. The clearance procedure of the second protected area 100 may include checking to see if the entrant 104 has properly undergone the clearance procedure associated with the first protected area 100; if the entrant 104 has not done so, security personnel associated with the protected areas 100 may be notified and/or the entrant 104 can be redirected to the security entry point 116 of the first protected area 100. As an example, this configuration may be suitable for laboratories with strict sterilization requirements, as a first protected area could be the interior of the building where the laboratory is found, having a relatively simplistic clearance procedure to enter the building, while the second protected area could be the laboratory testing area, requiring the entrant 104 to pass a more strict clearance procedure which ensures the entrant 104 doesn't introduce contaminants into the laboratory that could interfere with the experiments performed therein.

A protected area 100 may have a primary entrance 102 and may further have a secondary entrance 126, both of which could have a clearance procedure, a security entry point 116, an entryway 114, and/or sensors 106 associated therewith. To gain access to a protected area 100, the entrant 104 could have to undergo the clearance procedure of the entrance 102, 126 they are attempting to access the protected area 100 through. A clearance procedure which results in a conclusion that there is a threat associated with the entrant 104 may lead to a threat response procedure being performed to mitigate the harm the threat could cause. If the opposite conclusion is reached (that there is not a threat associated with the entrant 104), the entrant 104 may be granted access to the protected area 100. In some embodiments, the clearance procedure of a primary entrance 102 may be stricter than that of a secondary entrance 126, in which case the primary entrance 102 may have in comparison more sensors 106 and/or stronger sensors 106 that can measure more parameters/measure parameters more accurately. The entrances 102, 126 may be configured such that an entrant 104, upon attempting to access a protected area 100 for the first time or after a predetermined time period has passed since last having access to the protected area 100, may be required to go through the primary entrance 102 and the stricter clearance procedure associated therewith. An entrant 104 who has already gone through the primary entrance 102 and the associated clearance procedure within the predetermined time period (e.g., within the same day) and/or has previously been given specialized clearance to enter through a secondary entrance 126 may instead access the protected area 100 via the secondary entrance 126. This configuration may serve a practical purpose, as the clearance procedure for a secondary entrance 126 may be faster (for example, via the entrant 104 only needing to provide an employee ID) and those who only need to leave the protected area 100 for a relatively short period of time can easily access the protected area 100 again (e.g., in the case the entrant 104 leaves temporarily for lunch, a meeting at another location, etc.). Protected areas 100 viable for the implementation of the systems and methods disclosed herein include those associated with critical infrastructure protection (CIP).

If an entrant 104 tries to enter via the secondary entrance 126 and has not met the conditions to enter the protected area 100 through this secondary entrance 126, that entrant 104 may be automatically denied entry through the secondary entrance 126 and redirected to the primary entrance 102. A protected area 100 may have multiple primary entrances 102 and/or secondary entrances 126, wherein the entrances of the same type may have similar clearance procedures associated therewith; this configuration may be ideal for protected areas 100 that are expected to have a large number of people entering at the same time so as to avoid creating bottlenecks at the entrances 102, 126. There could also be more types of entrances in addition to primary entrances 102 and secondary entrances 126 for a protected area 100, each of which could have different clearance procedures associated therewith. These further types of entrances could be designated as tertiary entrances, quaternary entrances, etc.

To attempt to gain access to a protected area 100, an entrant 104 may first enter a clearance entry point 116 wherein one or more steps of the clearance procedure may be performed. In the event that the entrant 104 attempts to force their way through the clearance entry point 116 without undergoing the clearance procedure or is uncooperative to instructions (such as not moving themselves from the secondary entrance 126 to the primary entrance 102 when instructed to do so), the entrant 104 may be at least automatically and partially contained in the clearance entry point 116 such that they cannot gain access to the protected area 100. In these scenarios, the containment methodologies to be detailed in the discussion of the threat response procedures may be utilized. Entryways 114 may be associated with a clearance entry point 116, such as an outer entryway 114 where an entrant 104 can enter a clearance entry point 116 and/or an inner entryway 114 where an entrant 104 can exit a clearance entry point 116 and enter a protected area 100 once the entrant 104 passes the clearance procedure. Entry points 116 may merely be designated areas associated with an entrance 102, 126 of a protected area 100 wherein clearance procedures may be at least partially performed; as such, entry points 116 can be outdoors and the entryways 114 and may comprise physical structures and/or additional embedded features.

Sensors 106 may scan people to measure parameters that could correspond to health risk factors and weapons detection. These parameters may be utilized to detect a potential threat on or from the entrant 104 and/or ascertain the risk associated with the threat, as will be detailed later in this disclosure. Each sensor 106 can be positioned and configured to scan people at various locations like the perimeter (site), entrance(s) 102, 126, entryway(s) 114, clearance entry point(s) 116, and/or the periphery surrounding the protected area 100. Within these locations, zones may be designated such as break areas, choke points, general access lanes, off-limits/restricted areas, etc. Sensors 106 may be positioned anywhere throughout a protected area 100, the entrances 102, 126 and the perimeter, including, for example, the insides and outsides of a building that defines the protected area 100. Ideally, the placement of the sensors 106 can be associated with structures and fixtures found in and around the protected area 100, which may come in the form of the sensors 106 being embedded within these elements. As an example, sensors 106 may be embedded within a wall 132 (which could at least partially define the clearance entry point 116) the prescreening device 108, or environmental features like planters 140, which may be found outside the protected area 100. Sensors 106 could also be associated with protective elements like a protective shielding panel or other fixture. In this respect, the panels of U.S. Pat. No. 10,788,294 entitled "Ballistic resistant laminate panel", the disclosure of which is incorporated herein by reference, may be utilized. In particular, sensors of this disclosure may be embedded in a ballistic resistant, fragmentation debris capture laminate panel comprising a thermoplastic resin architectural panel having a decorative element. This decorative element may come in the form of a decorative or image-bearing material capable of use in architectural design, image simulation, and camouflage. Such panels may be the result of one or more decorative layers being added to a bullet resistant material as part of the process of manufacturing the panel. The decorative layers may be selected from compatible decorative films, sheets or constructed panels, such as those available from 3 form, Inc. (Utah, USA). Such constructed panels may also comprise wood veneers, surface textures or other visual elements well known to those familiar with the art. Images may also be pressed, printed or painted onto the ballistic resistant material. The optional decorative layer may be an image useful to camouflage the fragmentation debris capture material. More specifically, it is possible that an installation of the bullet resistant, fragmentation debris capture material could be designed and installed to resemble the appearance of a building interior or exterior material, and be used to mimic the construction and appearance of a structure, and protect the structure and its occupants. Alternatively, the bullet resistant, fragmentation debris capture material could be fabricated with a decorative layer and incorporated as a distinct design element of a structure while achieving its purpose as a protective barrier. The sensor modalities encompassed by this disclosure include those currently known and those that would be developed in the future, as would be appreciated by those skilled in the art. These elements may help to protect the sensors 106 and/or occupants so that hostile entrants 104 may not be able to target and deactivate those sensors 106 as easily. The plurality of sensors 106 implemented may comprise passive sensors and/or active sensors. Passive sensors may passively scan the perimeter, including at points of entry, during hours of operation; these passive sensors could serve to provide a preliminary scan of an entrant 104 to detect for potential threats which could be easier to detect and/or harder for an entrant 104 to conceal. If these passive sensors are capable of detecting a threat in this manner before a clearance procedure begins, the threat response could be performed without need of a clearance procedure. Alternatively, measurements from passive sensors could indicate that a potential threat is present on or by an entrant 104 but come short of being able to fully identify the threat. In such a case, the clearance procedure may be adjusted to preemptively prepare for a threat response procedure and/or more thoroughly check the entrant 104 to confirm the presence of the potential threat. Passive sensors may be more suitable to be positioned in environmental features 140 surrounding the protected area 100. Active sensors, which may become activated during the clearance procedure, may be more precise, fine-tuned, and/or energy intensive to detect concealable threats which the passive sensors may not be as capable of detecting. There may be a cue which activates the sensors 106, such as the entrant 104 consenting to being scanned, which can be accomplished through the prescreening device 108, for instance. Passive and active sensors 106 may thus define electronic rings of protection around the protected area 100, such that as an entrant 104 approaches the protected area 100, the sensors 106 are more capable of detecting potential threats that could be associated with the entrant 104.

An entrant 104 may also, or alternatively, directly provide information as part of the clearance procedure. This can also be accomplished by an entrant 104 interacting with a prescreening device 108, in that the entrant 104 may enter information on a display 112 on the prescreening device 108. The display 112 may provide prompts and/or questions for the entrant 104 to answer via touch screen, buttons, voice, etc. Other techniques, including the entrant 104 interacting with a mobile device with a predownloaded application and/or verbally answering prompts/questions from a security employee, may allow the entrant 104 to directly provide information. The types of information which the entrant 104 may be instructed to provide for the clearance procedure may include prior travel history, illness exposure, wellness history, and more.

Sensors 106 may scan people to measure parameters that could correspond to health risk factors and weapons detection. These parameters may be utilized to detect a potential threat on or from the entrant 104 and/or ascertain the risk associated with the threat, as will be detailed later in this disclosure. Each sensor 106 can be positioned and configured to scan people at various locations like the perimeter (site), entrance(s) 102, 126, entryway(s) 114, clearance entry point(s) 116, and/or the periphery surrounding the protected area 100. Within these locations, zones may be designated such as break areas, choke points, general access lanes, off-limits/restricted areas, etc. Sensors 106 may be positioned anywhere throughout a protected area 100, the entrances 102, 126 and the perimeter, including, for example, the insides and outsides of a building that defines the protected area 100. Ideally, the placement of the sensors 106 can be associated with structures and fixtures found in and around the protected area 100, which may come in the form of the sensors 106 being embedded within these elements. As an example, sensors 106 may be embedded within a wall 132 (which could at least partially define the clearance entry point 116) the prescreening device 108, or environmental features like planters 140, which may be found outside the protected area 100. Sensors 106 could also be associated with protective elements like a protective shielding panel or other fixture. In this respect, the panels of U.S. Pat. No. 10,788,294 entitled "Ballistic resistant laminate panel", the disclosure of which is incorporated herein by reference, may be utilized. The sensor modalities encompassed by this disclosure include those currently known and those that would be developed in the future, as would be appreciated by those skilled in the art. These elements may help to protect the sensors 106 and/or occupants so that hostile entrants 104 may not be able to target and deactivate those sensors 106 as easily. The plurality of sensors 106 implemented may comprise passive sensors and/or active sensors. Passive sensors may passively scan the perimeter, including at points of entry, during hours of operation; these passive sensors could serve to provide a preliminary scan of an entrant 104 to detect for potential threats which could be easier to detect and/or harder for an entrant 104 to conceal. If these passive sensors are capable of detecting a threat in this manner before a clearance procedure begins, the threat response could be performed without need of a clearance procedure. Alternatively, measurements from passive sensors could indicate that a potential threat is present on or by an entrant 104 but come short of being able to fully identify the threat. In such a case, the clearance procedure may be adjusted to preemptively prepare for a threat response procedure and/or more thoroughly check the entrant 104 to confirm the presence of the potential threat. Passive sensors may be more suitable to be positioned in environmental features 140 surrounding the protected area 100. Active sensors, which may become activated during the clearance procedure, may be more precise, fine-tuned, and/or energy intensive to detect concealable threats which the passive sensors may not be as capable of detecting. There may be a cue which activates the sensors 106, such as the entrant 104 consenting to being scanned, which can be accomplished through the prescreening device 108, for instance. Passive and active sensors 106 may thus define electronic rings of protection around the protected area 100, such that as an entrant 104 approaches the protected area 100, the sensors 106 are more capable of detecting potential threats that could be associated with the entrant 104.

The automated clearance procedure may comprise the entrant 104 being scanned by a plurality of these sensors 106. The entrant 104 may be provided with instructions which the entrant 104 may have to carry out to be effectively scanned by the sensors 106, such as the aforementioned consent to being scanned, positioning themselves within the clearance entry point 116 at a particular location/a particular posture, etc.

A wide range of sensors 106 can be used, each of which may be specialized for the detection of a particular threat or capable of identifying multiple threats. Bio-metric sensors may measure vital signs of an entrant 104 which may be used to derive health risk factors indicative of the presence of a health threat. As will be detailed later within this disclosure, the health risk factors of an entrant 104 may be compared against a precompiled wellness baseline for that entrant 104 to determine the potential presence of a health threat. These bio-metric sensors may include, but are not strictly limited to, non-contact infrared sensors, radar sensors, camera-based optical sensors, high precision temperature sensors, electrocardiograph sensors (ECG), electroencephalograph sensors (EEG), electromyography sensors (EMG), motion sensors, plethysmographs (including oximeters), and combinations thereof. The vital signs of the entrant 104 that can be obtained from these sensors 106 include the bioelectrical activity, blood circulation, temperature, respiration rate, heart rate, heart rate variability, oxygen levels, and oxygen saturation rate of the entrant 104. Bio-metric sensors 106 may also, or alternatively, include techniques and technologies for facial recognition. Digital images of the entrant 104 may be converted from spatial domain, frequency domain, and/or time domain conversions using fast Fourier transformations or fast Hartley transformations, for example. Facial recognition techniques used may be based on convolutional neutral network (CNN) and/or other machine learning algorithms to model the spatial and semantic relationships between the features and objects in the digital images to identify signs of health threats on the entrant 104.

Sensors 106 which may detect weapons on an entrant 104 may include, but are not limited to, pulse induction detectors, low frequency detectors, zero voltage detectors, radio frequency detectors, infrared detectors, millimeter wave detectors, and combinations thereof. CBRNE materials can be detected via analyzing vapors and aerosols around an entrant 104. These gaseous analytes from the entrant 104 can be examined through the use of sniffers, for instance CBRNE threats can then be identified within these gaseous analytes through techniques like mobile gas chromatography, mass spectrometry, ion mobility spectrometry, Fourier transform infrared (FT-IR) spectrometry, radiological detection, and combinations thereof.

Based on the information obtained from the clearance procedure, the potential presence of a threat on or from an entrant 104 may be detected and the risk associated with that threat may be determined using, for instance, machine learning and/or artificial intelligence methods. Assessing the potential threat in this manner may occur through one or more processors installed within local network hub and/or a cloud-based system receiving the data gathered from the sensors 106, the entrant 104 and/or prescreening device(s) 108, as will be detailed later within this disclosure. The confirmation of a threat on or from the entrant 104 may then be followed by a threat response activation procedure.

However, depending on the configuration utilized and/or the data processed, the clearance procedure may have additional steps to confirm the presence of the threat. In these situations, the clearance procedure may further comprise rescanning the entrant 104 and/or testing the entrant 104/testing an object the entrant 104 is carrying to confirm the presence of a threat and/or further examine the potential threat. The reevaluation methodology used may depend on the type of threat and/or its corresponding risk believed to be associated with the entrant 104 based on the preliminary threat assessment. Rescanning and/or testing can take place at the clearance entry point 116 (in the former case, the same sensors 106 can be utilized for rescanning). Alternatively, the entrant 104 can be directed to a quarantine area 120 before rescanning/testing. A quarantine area entryway 128 may connect the quarantine area 120 to the clearance entry point 116, and this entryway 128 may be sealable so that after an entrant 104 carrying a potential threat enters, the entryway 128 can be sealed so that the risk of the threat spreading from the quarantine area 120 or causing harm may be mitigated. If the information obtained thus far from the clearance procedure indicates that the entrant 104 has a health threat, medical staff 124 within the quarantine area 120 may test the entrant 104 believed to be carrying a health threat to confirm the presence of the health threat. In this respect, the medical staff 124 may administer a medical test 122 to the entrant 104, like one or more antigen PCR test (so multiple infections can be tested), analyzing a swab taken of the entrant 104, and/or electronic-based testing. This medical test 122 may be suited to detect a specific health threat an entrant 104 is believed to be carrying, such as a known, spreading contagion. Producing a negative test result for the medical test may lead to the entrant 104 being released from the quarantine area 120 and being granted access to the protected area 100, while a positive test may lead to a threat response procedure being performed. An object the entrant 104 is carrying may be tested to confirm the presence of/further ascertain if the object is a particular CBRNE threat. Re-evaluation/resetting may also take place at an offsite testing location if suitable; in this scenario, after a clearance procedure indicates the presence of a threat, the entrant 104 can be referred to the testing location where the potential threat can be examined.

A threat response procedure can be performed in response to the detected threat and the risk associated therewith. This threat response procedure can be determined through one or more processors installed within the local network hub, cloud-based system, or a combination of both, which can be the same hub/system that can be used during a clearance procedure. The threat response procedure determined may be based on the entrant's information and identification as well as the detected threat and the associated measured parameters via an algorithm receiving the data from the clearance procedure, and as such, certain steps of a threat response procedure may or may not occur depending on the type of threat detected and the danger it may pose. For example, certain detected physical threats may result in a different threat response procedure and thus different steps being performed when compared to other physical threats or certain health threats.

The threat response procedure may comprise automatically denying the entrant 104 access to the protected area 100 (e.g., a "go/no go" safe entry determination) and/or at least partially containing the entrant 104, both of which may be accomplished at the same time via using a containment methodology that effectively achieves both results. One or more inner entryways 114 from the security entry point 116 to the protected area 100 may be sealable, and as such sealing these inner entryways 114 may prevent the entrant 104 from gaining access to the protected area 100. The inner entryway(s) 114 may be configured such that by default they remain open and only seal if an entrant 104 is found to be carrying a threat or if the entrant 104 tries to force their way through the clearance entry point 116; alternatively, the inner entryway(s) 114 may remain sealed by default and only open to let an entrant 104 into the protected area 100 if the entrant 104 passes the clearance procedure. The outer entryway(s) 114 may also be sealable, and depending on the threat response procedure being performed, the outer entryway(s) 114 may also seal to further contain the entrant 104, which may be the case for threat response procedures where an entrant 104 needs to be arrested and prevented from escaping. Therefore, the entrant 104 could be partially contained in the clearance entry point 116 via sealing the inner entryway(s) 114, or the entrant 104 could be fully contained in the clearance entry point 116 by sealing any and all entryways 114, 128 connected to the clearance entry point 116. The housing 130 of a prescreening device 108 may also be similarly capable of sealing to aid in containing the entrant 104. Actuators may be used in these sealing processes, and these acts of sealing may be automatic such that detection of a particular threat may automatically trigger the actuators to close a door, for example.

If the entrant 104 is not already in the quarantine area 120, the entrant 104 may be directed or forced into a quarantine area 120 as part of the threat response procedure. There may be multiple, separate quarantine areas 120 associated with a clearance entry point 116 intended for different purposes. For example, one quarantine area 120 could serve to isolate and treat health threats, while another quarantine area 120 could be reserved for unresponsive entrants 104 and/or entrants 104 with dangerous physical threats to contain them before the entrant 104 can be properly arrested, disarmed, seized, etc.

In the case of health threats, the entrant 104 may be given instructions as part of the threat response procedure as to how to quarantine to prevent spreading the health threat and/or medical treatment instructions (i.e., including a referral for a medical test and treatment). The entrant 104 may be required to wait a predetermined period of time, be given a medically clear certification from a medical professional, and/or produce a negative test result in order to gain access to the protected area 100 upon a future visit. When this entrant 104 goes through the clearance procedure the next time, the identification of an entrant 104 may determine whether or not the entrant 104 has met the requirement(s). If the health threat comes in the form of physiological factors that could indicate the entrant 104 may be prone to an emergent or critical health event, the threat response procedure could comprise intervening so as to ensure the entrant 104 is sufficiently stable to safely enter and ambulate. Intervention may come in the form of redirecting the entrant 104 to a relevant location and/or having a suitable person speak with the entrant 104 and potentially evaluate them.

The threat response may further comprise notifying relevant persons about the threat. People within the protected area 100 could be notified of the threat, such as via an alarm sounding, and those people may be directed to safe areas and/or given safety instructions which could be according to safety protocols set by the administration of the protected area 100. Additionally, or alternatively, professionals that are capable of handling the entrant 104 and/or the threat associated therewith may be notified; these professionals may include the security personnel of the protected area 100, state/local emergency response service(s), etc. These professionals may also be given some or all of the information found during the clearance procedure about the entrant 104 as well as the type of threat associated therewith and the risk that threat may pose.

Figure 2:
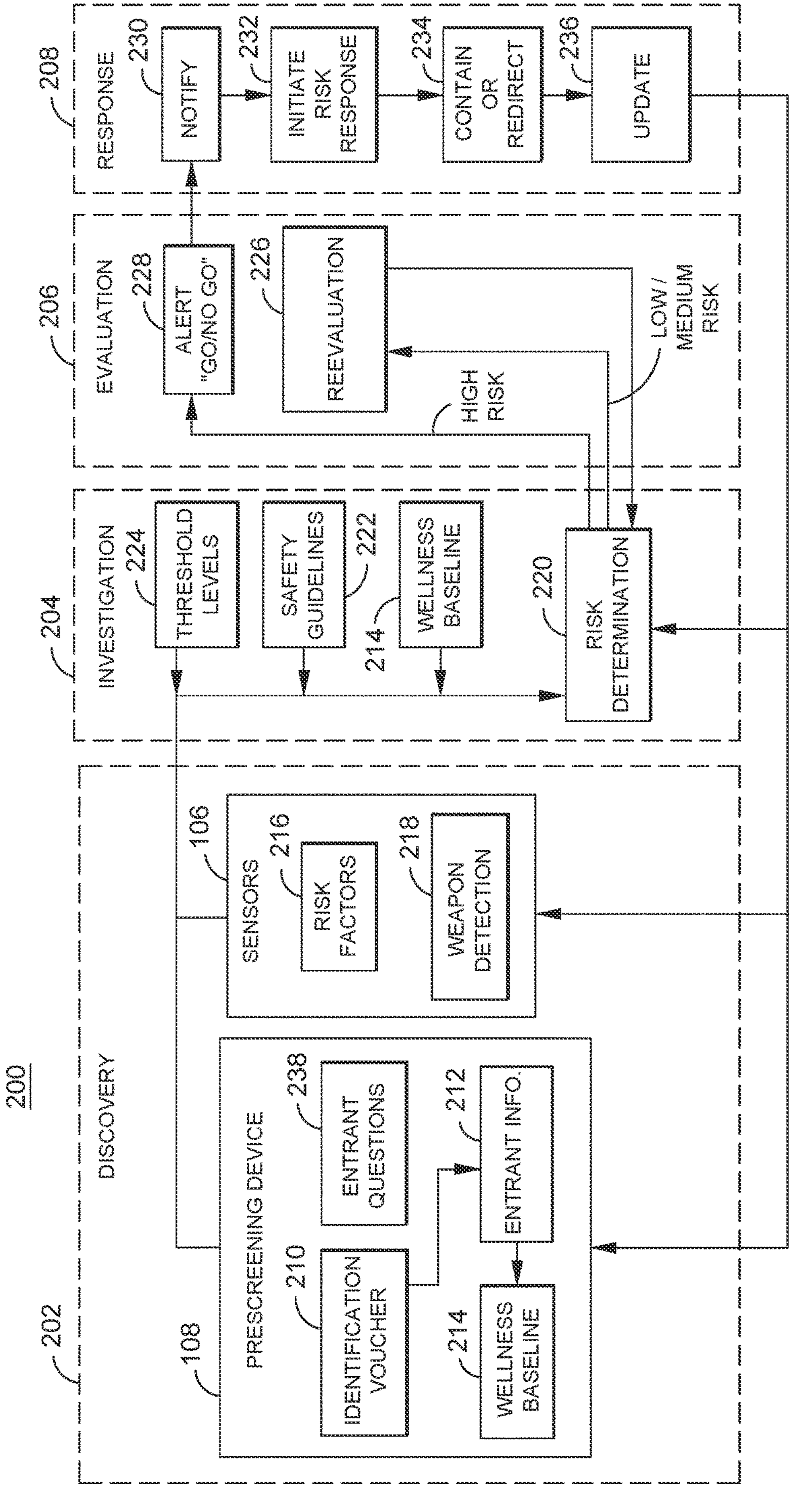
FIG. 2 is an exemplary operational flow diagram of a threat detection and threat response procedure.

Referring now to FIG. 2, an exemplary operational flow diagram of a threat detection and threat response procedure 200 is shown. The steps in this threat detection and response diagram 200 may be broadly categorized as discovery of a potential threat 202, investigation of the potential threat 204, evaluation of the potential threat 206, and development of threat response procedure 208 steps. Each of these categories 202, 204, 206, 208 may be carried out at least partially via the one or more processors at the local network hub and/or cloud-based system, as will be elaborated upon. Discovery 202 of a potential threat may occur as a result of performing at least the initial steps of a clearance procedure. As such, discovery 202 of the potential threat could be achieved via a preliminary scan of the entrant 104 at the perimeter, the identification of an entrant 104, gathering information directly from the entrant 104 via the entrant 104 interacting with a prescreening device 108, and/or the initial scanning of an entrant 104 with sensors 106 to derive the parameters corresponding to health risk factors 216 and/or weapon detection 218.

An entrant 104 may be identified when the entrant 104 interacts with the prescreening device 108 via providing an identification voucher 210, such as an employee ID card, a ticket, a QR code, a visitors pass, etc. With the entrant 104 now identified, previously compiled entrant information 212, may be retrieved. This entrant information 212 can be compiled through various channels, such as the entrant 104 providing information ahead of their attempt to access the protected area 100, data gathered by the sensors 106 when the entrant 104 has previously undergone one or more clearance procedures, and/or receiving information from an external source, like the information gathered as the entrant 104 has undergone clearance procedures for another protected area 100 implementing the systems/methods disclosed herein. Entrant information 212 can be compiled within and retrieved from a local network hub, which can be found in or around the protected area 100, and/or a database of a cloud-based system. Encryption and anonymization software techniques can be applied to ensure entrant information 212 is compliant with the Health Insurance Portability and Accountability Act (HIPAA) may be utilized in these networks. FOG/edge computing techniques may also be utilized to similarly protect entrant 104 data.

Entrant information 212 may comprise the travel history, exposure history, a wellness baseline, and/or more of the entrant 104. If particular contagions are known to be spreading in certain regions, the entrant's travel history could indicate that the entrant 104 may be carrying that health threat. A wellness baseline 214 may comprise the healthy vital signs of an entrant 104, which may be the same previously mentioned vital signs measurable by the sensors 106 (bioelectrical activity, blood circulation, temperature, respiration rate, heart rate, heart rate variability, oxygen levels, and/or oxygen saturation rate). The wellness baseline 214 may be compiled for an entrant 104 may be based on health data collected from the entrant 104 by the sensors 106 over the course of a period of time in which the entrant 104 has undergone the clearance procedure. It is contemplated that the health data obtained from sensors 106 associated with a clearance procedure of a separate protected area 100 which the entrant frequently visits/previously visited frequently may be used to generate a wellness baseline 214. The wellness baseline 214 may also or alternatively be based on the medical information of the entrant 104 and/or factors such as surgeries or types of medication that the entrant 104 may be taking which may affect the vital signs of an entrant 104; the entrant 104 may provide this information ahead of attempting to gain access to the protected area 100 and/or via the prescreening device 108 so that it can be accounted for during the clearance procedure. A wellness baseline 214 may at least partially be developed for an entrant 104 based on sensor 106 data gathered for an entrant over a relevant time period, which may be at least 30 days. Another factor, or an alternative factor a wellness baseline 214 could be based upon is a relevant number of clearance procedures performed on the entrant 104. In some embodiments, the wellness baseline could be based on at least 100 clearance procedures. A new wellness baseline 214 can be developed after a lengthy period of time has passed since the original wellness baseline 214 was developed (since the vital signs of an entrant 104 which would correspond to their wellness baseline may change as they become older). Comparing health risk factors 216 measured by the sensors 106 with this baseline may indicate the presence of a health threat, as deviations from the wellness baseline could indicate the presence of an infection or potentially emergent health condition or related behavior for that entrant 104, to name a couple of examples.

The information obtained from the entrant 104, the entrant information 212, entrant questions 238, health risk factors 216, and/or weapon detection 218, may be investigated 204 to make a risk determination 220 of the identification of the potential threat(s) and the risk that threat may pose, which may be carried out via one or more processors within a local network hub and/or a cloud-based system. The local hub and/or cloud-based system 312 may utilize algorithms and rules engines which can receive the information obtained from the clearance procedure to determine which response is suited for the threat(s) analyzed. This risk determination 220 may be based on safety guidelines 222, which may be provided by, for example, governmental guidelines (e.g., CDC, state, local medical guidelines, etc.), guidelines set by the administration of the protected area 100 (for example, the relevant security Standard Operating Procedures (SOPs)), and/or data and signs of emerging threats like spreading contagions. Threshold levels 224 may be set by these safety guidelines 222 and/or independently provided and compared to the parameters 216, 218 derived from the measurements of the sensors 106 and/or the wellness baseline 214 of the entrant to perform the risk determination 220. Each of the threshold levels 224 may be set to correspond to certain levels of risk like low, medium and high of risk such that a parameter exceeding a low threshold could be considered a low risk, while a parameter further exceeding a high threshold may be considered a high risk. There could additionally be further intermediate thresholds and levels of risk therebetween, like a medium threshold and a medium risk. Since multiple distinct threats could be detectable with one system, different threshold levels 224 for each type of threat may be set.

In the event that multiple threats are identified, risk determination 220 may further comprise prioritizing one or more of the threats to be the basis of threat response 208, which may be based on comparing the risk found for each of the detected threats. For example, if a gun and a contagion is identified on an entrant 104, the risk determination 220 may prioritize the gun threat, as that could have a higher level of risk associated therewith when compared to the contagion, and as such a threat response may be primarily based around the gun threat and minimizing the harm it could cause. Prioritizing one threat over another does not necessarily mean the other threat(s) associated with the entrant 104 have to be disregarded, and as such the steps performed/not performed in a threat response procedure 208 may or may not be based on these lesser threats. In the case of multiple threats, the risk ranking is determined to guide criticality, prioritization, and interdiction capability needed to address each threat.

Determining a low/medium risk from risk determination 220 may arise due to a threat that cannot be fully identified and ascertained, which may be a result of the entrant 104 effectively concealing the threat, the threat indicators being ambiguous, and/or the threat simply being hard to detect (which may be the result for threats that are present in low quantities). A low/medium level of risk being determined could also be the result of an erroneous discovery 202. Examples in which an erroneous discovery 202 may occur include the measured parameters reaching the threshold levels 224 but due to factors that don't correspond to a threat (i.e., a metal object that isn't a weapon, an irregular vital sign due to an unaccounted for newly prescribed medication the entrant 104 is taking, etc.) and/or error measurements by the sensors 106. Thus, the entrant 104 may be reevaluated 226, which can be embodied via the aforesaid rescanning of the entrant 104 and/or testing the entrant 104/testing an object the entrant 104 is carrying. Parameters of the same or higher values from re-evaluation 226 may lead to the confirmation of the presence of a threat. Upon confirmation of a threat, an alert 228 may be issued, which can include a "go/no go" safe entry determination, which can then lead to a threat response 208. In separate scenarios, it may be found in a risk determination 220 that there is more clearly identifiable, high risk, which could be due to a high threshold reading, in which case the alert 228 may be issued without the need for a re-evaluation 226.

Authorities can be automatically notified 230 following the detection of a threat, such as governmental first-responders, organizations and/or the security staff associated with the protected area 100, as mentioned previously. Depending on the threat detected, these personnel may initiate a risk response 232 which may lead to the entrant 104 being contained and/or redirected 234 to a quarantine area 120. The measured variables and data gathered by the entrant 104 may be used to update 236 earlier steps in the process, which may come in the form of updating the entrant information 212 of that entrant 104, updating the sensors 106 to target certain threats, and/or updating the algorithms/calculations performed by the local hub/cloud-based system in the risk determination 220.

Figure 3:
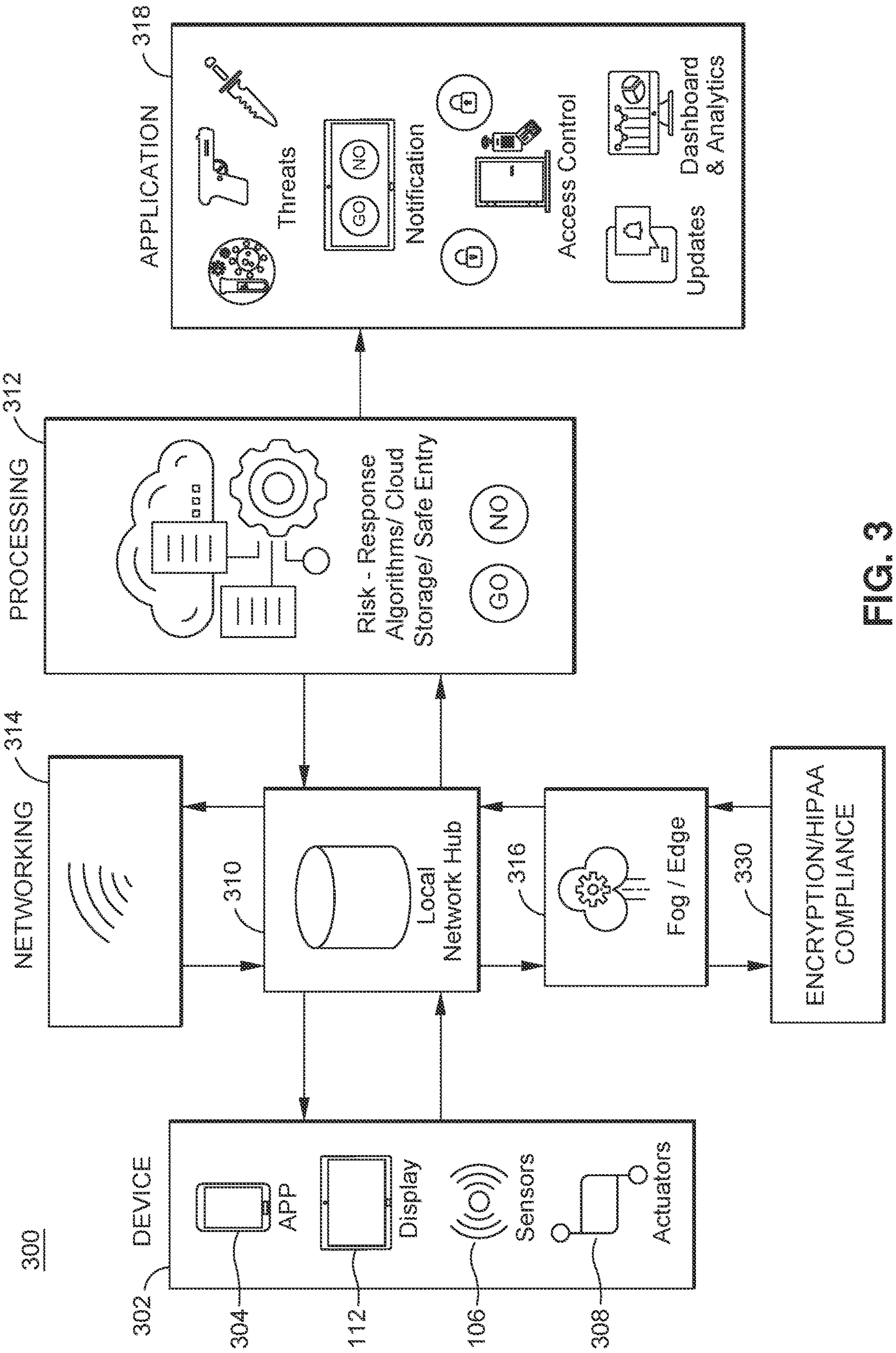
FIG. 3 is an architecture of a threat detection and response system.

Turning now to FIG. 3, an architecture of a threat detection and response system 300 is shown. Here, the interrelationship between a local network hub 310 and a cloud-based system 312 may be better appreciated. Information obtained in a clearance procedure may be received by a local network hub 310 in or around the protected area 100, which can include that obtained from devices 302 such as the aforementioned application 304 on a mobile device, the entrant 104 interacting with a display 112 on a prescreening device 108, sensors 106, and/or actuators 308. The local network hub 310 may receive this information from the devices 302 and further communicate with a cloud-based system 312 via network techniques, all of which may independently communicate with each other and transmit information via conventional technologies like internet communications (LAN, WAN), 4G/5G wireless, Bluetooth®, hardwired communication, etc. The data obtained from the devices 302 may be processed within the local network hub 310 and said processing may include FOG/edge computing 316 and/or encryption/HIPAA compliant techniques 330. After this processing and any further formatting of the data occurs in the local network hub 310, the cloud-based system 312 can receive and process the data to investigate and evaluate the threat. The cloud-based system 312 can then determine and initiate the proper threat risk(s) and response procedure(s), including denying the entrant 104 access to the protected area 100 ("go/no go" safe entry determination), notifying the proper personnel, at least partially containing the entrant 104, and/or updating the devices 302 and/or local network hub 310 as needed. Preferably, the cloud-based system 312 can be a closed cloud system.

Figure 4:
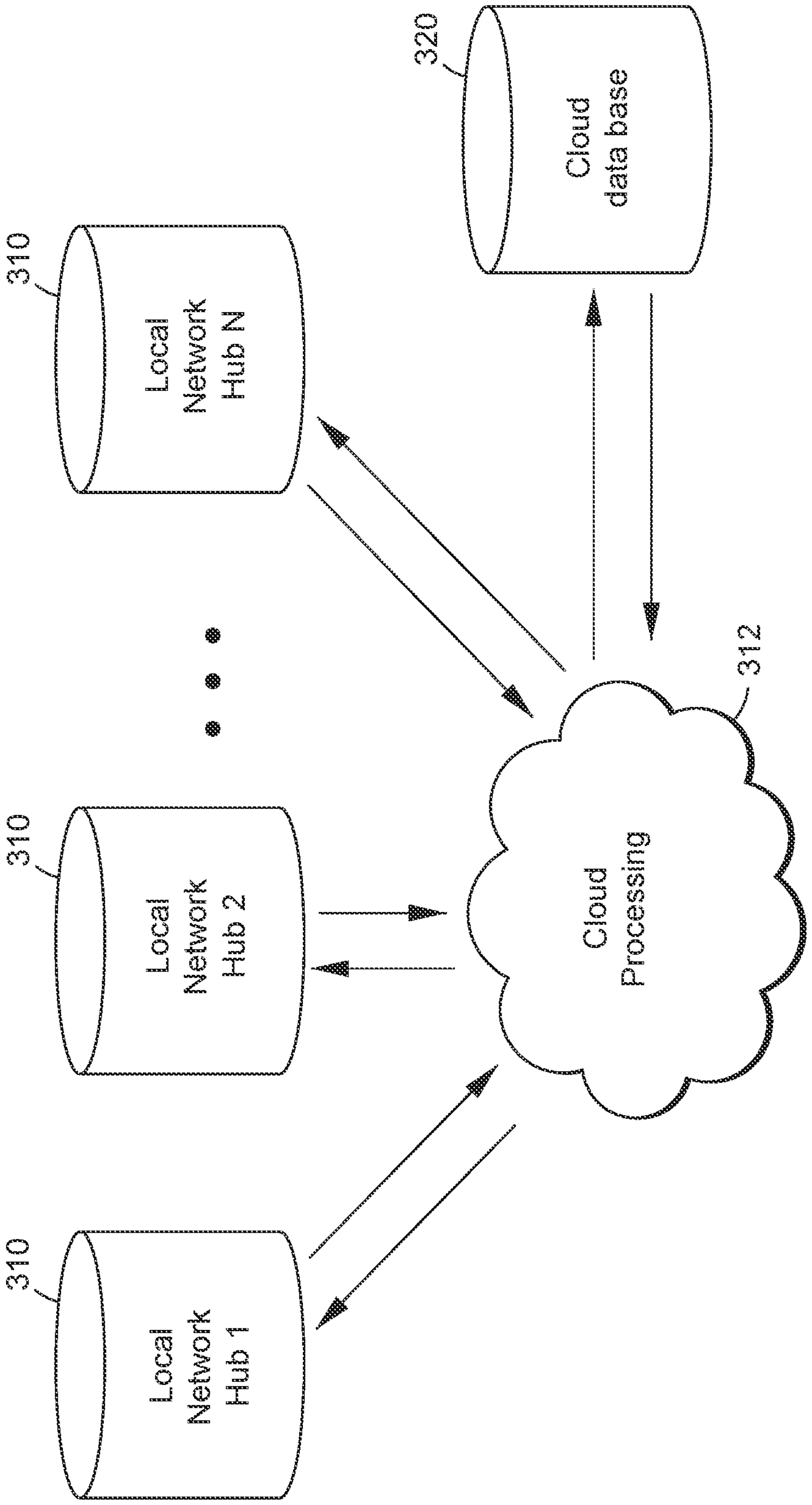
FIG. 4 shows a plurality of local network hubs interconnected with a cloud-based system.

Referring to FIG. 4, a plurality of local network hubs and how they may be interconnected with a cloud-based system is shown. Several local network hubs 310 employed in different protected areas 100 may communicate with a cloud processing system 312. This cloud-based system 312 may not only analyze potential threats and determine a threat response for multiple protected areas 100, but also update several local network hubs 310 and their associated systems to recognize particular entrants and specific threats like, for example, spreading health threats. To assist in risk determination 220, cloud processing 312 may have a cloud data base 320 which can have the aforementioned guidelines 222 and threshold levels 224 encoded within and updated as needed. The cloud data base 320 may also store information about previous encounters with entrants 104 which have been found to be carrying a threat during a clearance procedure associated with one the protected areas 100 one of the local network hubs 310 is associated with. These encounters can be automatically summarized, sent, and reviewed by the administration of a protected area 100, state or federal government agencies (in which case it may be a mandated filing), etc., which may then be used to improve organizational protection procedure, clearance procedures, threat response procedures, and processing timelines associated therewith. These reports could include trends, analytics, etc. corresponding to certain types of threats detected and responded to.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments. Additional modifications and improvements of the present invention may also be apparent to those of ordinary skill in the art. Thus, the particular combination of parts and steps described and illustrated herein is intended to represent only certain embodiments of the present invention and is not intended to serve as limitations of alternative devices and methods within the spirit and scope of the invention.

What is claimed is:

1. A method of preventing an entrant associated with a potential threat from gaining access to a protected area, the method comprising the steps of:

a) performing a preliminary scan for the entrant at a periphery of the protected area as the entrant approaches a clearance entry point to detect the potential threat, the preliminary scan comprising: scanning the entrant with one or more sensors embedded in an environmental feature outside of the protected area to derive parameters that correspond to the potential threat;

b) performing an automated clearance procedure for the entrant at the clearance entry point to detect the potential threat, the clearance procedure comprising: scanning the entrant with a plurality of sensors to derive parameters that correspond to the potential threat, at least some of the plurality of sensors being embedded in a ballistic resistant, fragmentation debris capture laminate panel comprising a thermoplastic resin architectural panel having a decorative element; and c) performing an initial automated threat response procedure based on the detected potential threat, the parameters derived during step a), and the parameters derived during step b), the threat response procedure comprising: preventing the entrant from gaining access to the protected area.

2. The method of claim 1, wherein the potential threat is a health threat, the health threat being a contagion, an emergent physiological health factor, or both, the contagion being selected from the group consisting of: a viral infection, a bacterial infection, or combinations thereof.

3. The method of claim 1, wherein the potential threat is a physical threat selected from the group consisting of: a gun, a knife, a chemical material, a biological material, a radiological material, a nuclear material, an explosive material, or combinations thereof.

4. The method of claim 1, wherein at least some of the plurality of sensors are active sensors; and wherein the clearance procedure further comprises activating the active sensors.

5. The method of claim 1, wherein the clearance entry point further comprises a prescreening device; and wherein the clearance procedure further comprises obtaining information directly from the entrant via the entrant interacting with the prescreening device.

6. The method of claim 1, wherein the clearance procedure further comprises retrieving information previously compiled from the entrant.

7. The method of claim 6, wherein the information previously compiled from the entrant comprises a wellness baseline for the entrant; and wherein the threat response procedure is further based on the wellness baseline.

8. The method of claim 1, wherein the threat response procedure further comprises directing the entrant to a quarantine area.

9. The method of claim 1, wherein the threat response procedure further comprises automatically notifying one or more agencies of the potential threat, the entrant, or both.

10. The method of claim 1, wherein the threat response procedure is determined at least partially by a local network hub.

11. The method of claim 10, wherein the threat response procedure is further determined by a cloud-based system in communication with the local network hub.

12. The method of claim 1, wherein the threat response procedure comprises at least partially and automatically containing the entrant within the clearance entry point.

13. The method of claim 12, wherein said containing comprises automatically sealing one or more entryways associated with the clearance entry point.

14. The method of claim 1, wherein the clearance procedure further comprises rescanning the entrant with the plurality of sensors to rederive the parameters to confirm the presence of the potential threat.

15. The method of claim 1, wherein the clearance procedure further comprises testing the entrant to confirm the presence of a bio-health threat, or testing an object the entrant is carrying to confirm the presence of a physical threat.

16. The method of claim 1, wherein the threat response procedure is based on a governmental guideline, an organizational guideline, or both corresponding to the potential threat.

17. The method of claim 16, wherein the threat response procedure is further based on one of the parameters exceeding a threshold value determined from the governmental guideline, the organizational guideline, or both.

18. A system for preventing an entrant associated with a potential threat from gaining access to a protected area, the system comprising:

a prescreening device, the prescreening device being associated with a primary entrance for the protected area, the prescreening device being operative to receive information from the entrant, receive an identifier from the entrant, or both;

one or more sensors embedded in an environmental feature outside of the protected area, the one or more sensors being operative to scan the entrant at a periphery of the protected area as the entrant approaches the primary entrance to derive parameters that correspond to the potential threat;

a plurality of sensors, the plurality of sensors being associated with the primary entrance, the plurality of sensors being operative to scan the entrant within a clearance entry point to derive parameters that correspond to the potential threat, at least some of the plurality of sensors being embedded in a ballistic resistant, fragmentation debris capture laminate panel comprising a thermoplastic resin architectural panel having a decorative element; and one or more processors operative to detect the potential threat and determine a threat response procedure based on the parameters derived by the one or more sensors embedded in the environmental feature, the parameters derived by the plurality of sensors associated with the primary entrance, and the data received by the prescreening device, or both.

19. The system of claim 18, wherein the system further comprises a local network hub and a cloud-based system; and wherein the one or more processors are installed in the local network, the cloud-based system, or both.

20. The system of claim 18, wherein the system further comprises:

a secondary prescreening device, the secondary prescreening device being associated with a secondary entrance for the protected area, the secondary prescreening device being operative to receive information from the entrant, receive an identifier from the entrant, or both; and wherein the one or more processors are further operative to determine a secondary threat response procedure based on the information received from the secondary prescreening device, information previously compiled from the entrant, or both.

* * * * *